(12) United States Patent
Zadro

(10) Patent No.: US 6,238,052 B1
(45) Date of Patent: May 29, 2001

(54) ADJUSTABLE MAGNIFICATION FOGLESS MIRROR

(76) Inventor: Zlatko Zadro, 5332 System Dr., Huntington Beach, CA (US) 92649

( * ) Notice: Subject to any disclaimer, the term of this patent is extended or adjusted under 35 U.S.C. 154(b) by 0 days.

(21) Appl. No.: 09/517,810

(22) Filed: Mar. 2, 2000

(51) Int. Cl.[7] .............................. G02B 5/08; G02B 7/182
(52) U.S. Cl. ......................... 359/507; 359/512; 359/846; 359/872
(58) Field of Search .................................... 359/507, 509, 359/512, 513, 514, 845, 846, 847, 840, 871, 872

(56) References Cited

U.S. PATENT DOCUMENTS

| | | | |
|---|---|---|---|
| 1,530,441 | * 3/1925 | Thomson | 359/845 |
| 2,952,189 | * 9/1960 | Pajes | 359/847 |
| 3,031,928 | * 5/1962 | Kopito | 359/847 |
| 3,054,328 | * 9/1962 | Rodgers | 359/847 |
| 3,594,063 | * 7/1971 | Smillie, III | 359/512 |
| 3,972,600 | * 8/1976 | Cobarg | 359/840 |
| 4,033,676 | * 7/1977 | Brantley, Jr. et al. | 359/847 |
| 4,557,003 | * 12/1985 | Jones | 359/512 |
| 4,733,468 | * 3/1988 | Zadro . | |
| 4,832,475 | * 5/1989 | Daniels | 359/512 |
| 4,836,668 | * 6/1989 | Christianson | 359/512 |
| 5,058,271 | * 10/1991 | Jursich et al. . | |
| 5,953,157 | * 9/1999 | Christianson | 359/507 |

FOREIGN PATENT DOCUMENTS

0159613 * 7/1986 (JP) ...................................... 359/847

* cited by examiner

Primary Examiner—Ricky D. Shafer
(74) Attorney, Agent, or Firm—William L. Chapin

(57) ABSTRACT

A mirror ideally suited for use in a shower enclosure, bathroom or other high humidity environment is adjustable by a user to provide a magnification increasable from unity to three times or more, as well as being resistant to condensation fogging of viewing surfaces thereof. A fogless adjustable magnification mirror according to the present invention includes a ring-shaped frame which holds within an inner peripheral wall surface thereof a clear front viewing window and a rear flexible mirror plate or diaphragm having a reflective surface and a circular shape. The viewing window and mirror plate are held within the frame in a fluid pressure-tight seal, and form therebetween a sealed hollow cylindrically-shaped interior space or plenum bordered on a peripheral longitudinal surface thereof by the inner annular surface of the frame. An inlet port which penetrates the frame and communicates with the plenum has coupled thereto a conduit adapted to be coupled at the opposite end of the conduit to a source of warm water, preferably provided by a T-fitting which fits between a shower head and water supply pipe, and which diverts a small percentage, e.g., 5% to 10% of water flowing through the T-fitting into the inlet conduit. An outlet port which penetrates the frame and communicates with the plenum is coupled at an outer end to a throttle valve which is adjustable to adjust the outlet fluid flow cross-section.

22 Claims, 4 Drawing Sheets

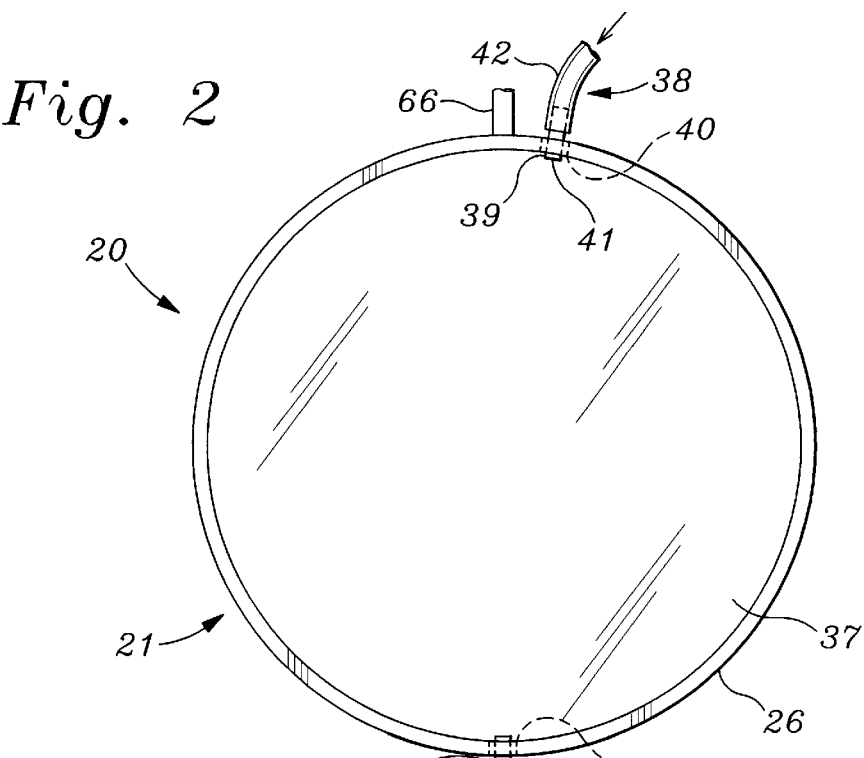
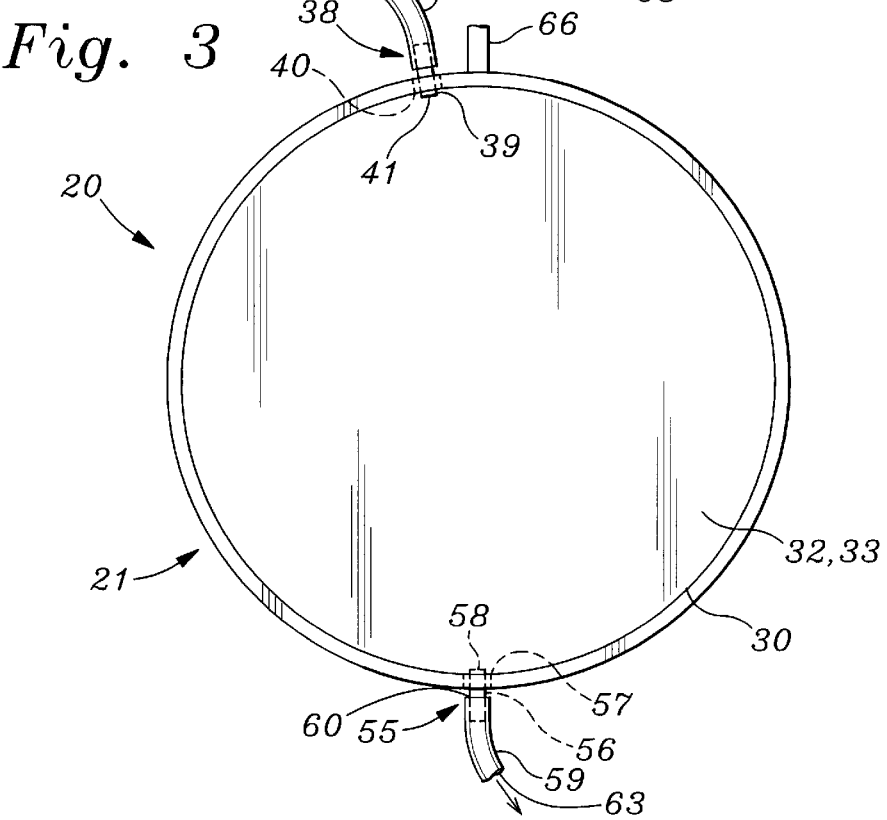

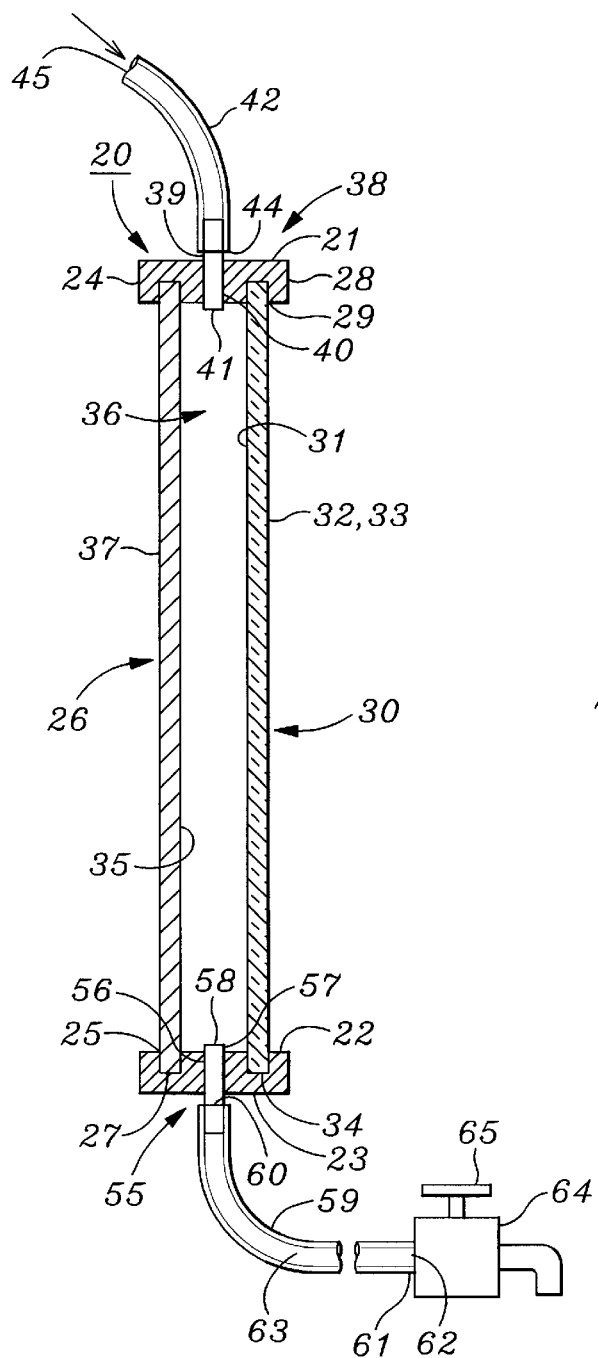
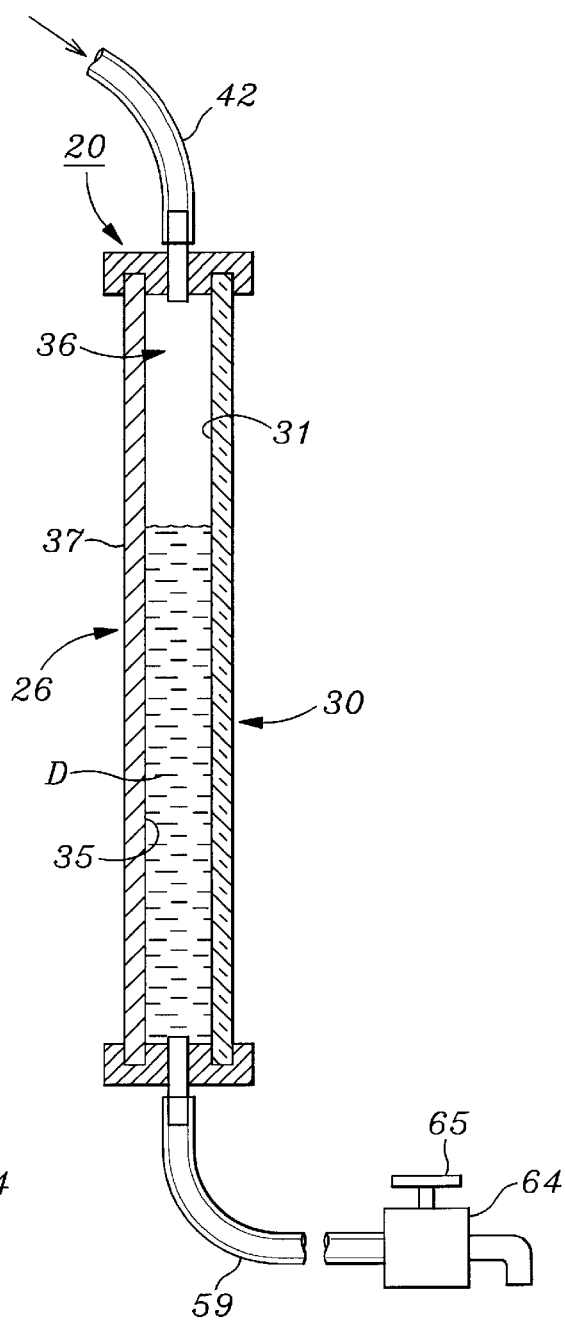

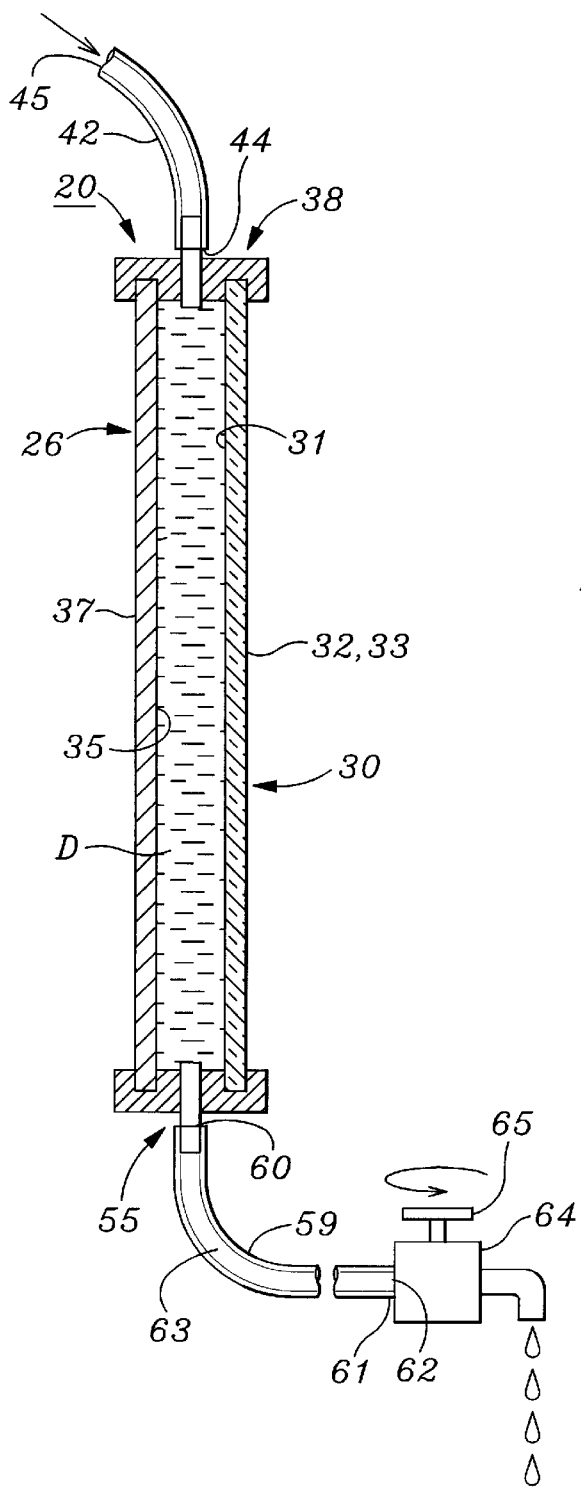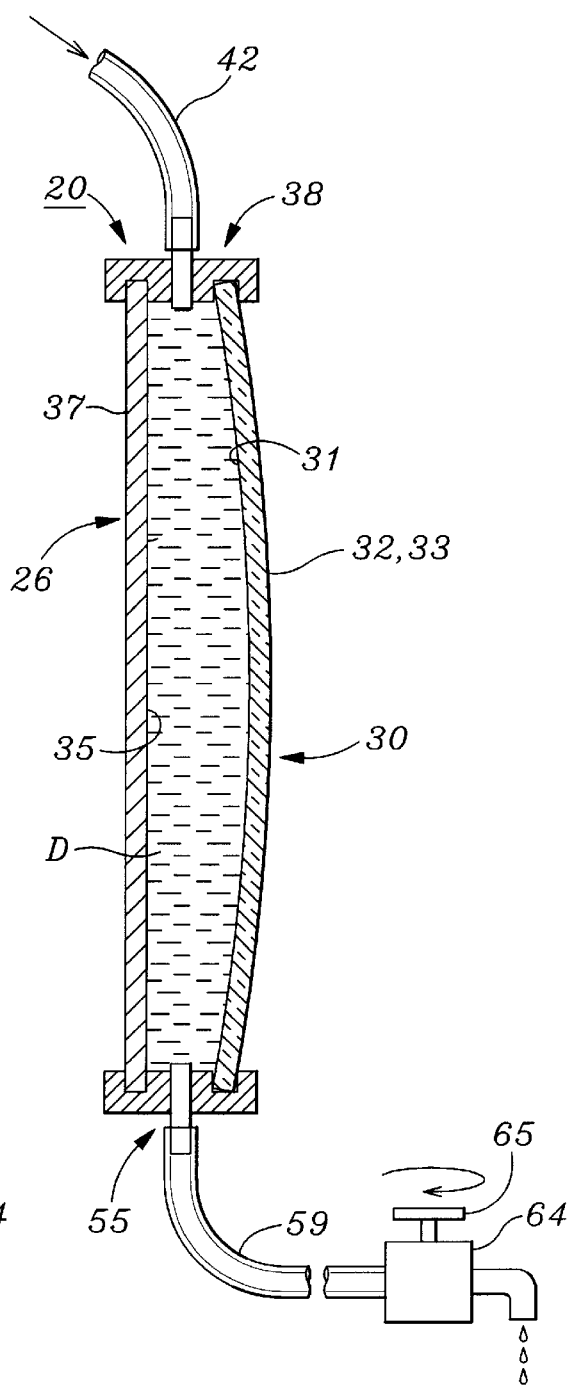

ADJUSTABLE MAGNIFICATION FOGLESS MIRROR

BACKGROUND OF THE INVENTION

A. Field of the Invention

The present invention relates to mirrors of the type used by people to facilitate performance of personal care functions such as shaving, applying cosmetics, and the like. More particularly, the invention relates to a novel mirror having a magnification that may be readily varied by a user, and which also resists formation of water condensation droplets or fog on the viewing surface thereof, thus permitting the mirror to function effectively in humid environments such as shower enclosures and bathrooms.

B. Description of Background Art

A substantial number of people utilize mirrors while showering to facilitate performance of personal care functions such as shaving. However, the use of mirrors in showers was formerly relatively limited, because the warm moist air within a shower enclosure tends to quickly condense on the surface of any mirror used in the shower, obscuring an image of a person's face reflected from the mirror surface so completely as to render the mirror practically useless within a few minutes after a shower has begun.

In response to the problem of moisture condensing on a mirror surface and thereby limiting the usefulness of mirrors in high humidity environments, such as shower enclosures and other locations within a bathroom, the present inventor disclosed in U.S. Pat. No. 4,733,468, issued Mar. 29, 1988, a "fogless" mirror which is highly resistant to formation of condensation droplets on the surface of the mirror. The fogless mirror disclosed in the '468 patent utilizes warm water tapped from the warm water supply pipe to a shower head, to heat the surface of the mirror. Since water vapor in a shower produced largely by evaporation, the water vapor is always somewhat cooler than the warm water supplied to the shower head. And, since water vapor will condense only on surfaces which are at lower temperature than the vapor, heating the surface of the mirror precludes fogging of the mirror. Therefore, the fogless mirror disclosed in the present inventor's '468 patent proved to be a highly effective solution to the problem of bathroom mirror fogging, and mirrors utilizing the teachings of that patent have been widely marketed and used.

The disclosure of a practical and effective fogless mirror in the present inventor's '468 patent solved the problem of providing a bathroom mirror of unity magnification which is non-fogging. However, there are a variety of circumstances in which it would be desirable to have available a face mirror that has a variable magnification. For example, detailed hygienic or cosmetic functions which involve eyebrows or eye lashes benefit from the use of a concave magnification mirror. But, since the field of view of a magnifying mirror of a given size is inherently smaller than that of a flat, unity-magnification mirror, a magnifying mirror may be unsuitable for performing other functions, such as shaving, which preferably employs a mirror having a larger field of view which encompasses the entire face. Therefore, shaving and performing other such tasks related to personal hygiene or beautification would oftentimes be facilitated by the use of a mirror having multiple discrete or continuously variable magnifications. In response to this need, the present inventor disclosed a Variable Magnification Mirror in U.S. Pat. No. 5,900,996, which issued on May 4, 1999. That patent disclosed a variable magnification mirror having a thin diaphragm provided with a reflective front surface and includes a mechanism for deforming the diaphragm from a flat shape, yielding unity magnification of images formed by the reflective surface, to adjustably greater curvatures yielding adjustably larger magnification factors. The mechanism includes a screw-driven, flexible circular puller plate fastened to a rear central portion of the rear surface of the reflective diaphragm, the outer peripheral edge of the diaphragm being held axially fixed with respect to the screw. In the preferred embodiment, the puller plate is so constructed as to have greater flexibility at outer radial portions thereof to accommodate larger angular defections of the outer radial portions of the diaphragm, thereby aiding in maintenance of substantially spherical, distortion free contour. The increased flexibility of outer radial portions of the puller plate is preferably effected by a radial taper provided in the puller plate cross section, the outer radial portions of the plate being progressively thinner than the central radial portion of the puller plate. Preferably, the puller plate is fastened to the rear surface of the reflective diaphragm by means of a resilient adhesive member, the elastic deformability of the member further aiding in maintenance of a substantially spherical diaphragm contour.

Although the variable magnification mirror disclosed in the '996 patent has proved to be a highly effective and widely accepted solution to the problem of providing a variable magnification mirror useful for personal hygiene tasks, there is no obvious practical way to incorporate a flow of warm water through the device to heat the mirror surface and thereby resist formation of condensation droplets on the mirror surface. Thus, a problem still persisted, particularly for people who are unable to wear eyeglasses or contact lenses while showering, yet wish to shave or perform other personal hygiene tasks in the shower. For such individuals, it would be highly desirable to have available a mirror of adjustable magnification to compensate for vision difficulties experienced with their eyeglasses or contact lenses removed. In view of the foregoing facts, the present inventor conceived of a fogless variable magnification mirror having a highly novel construction and function.

OBJECTS OF THE INVENTION

An object of the present invention is to provide a mirror having a magnification that is smoothly and readily variable over a substantial range of magnifications, and which resists formation of condensation fogging on image viewing surfaces thereof.

Another object of the invention is to provide a variable magnification fogless mirror which utilizes warm water to heat optical surfaces of the mirror above ambient atmospheric temperature, thereby minimizing condensation of water vapor droplets from the atmosphere onto the optical surfaces.

Another object of the invention is to provide a variable magnification fogless mirror which utilizes hydrostatic fluid pressure supplied by condensation-inhibiting warming water to deform a flexible reflective diaphragm into a concave reflecting surface.

Another object of the invention is to provide a variable magnification fogless mirror which utilizes warm water flowing in a chamber formed between a front viewing window and a rear flexible diaphragm having a mirrored surface to heat the viewing window and thereby minimize condensation fogging of the front surface of the viewing window.

Another object of the invention is to provide a variable magnification fogless mirror including a frame forming a heated interior plenum space between a front viewing window and a circular rear flexible diaphragm having a mirrored surface, the frame having an inlet port for receiving warm water under pressure, and an outlet port provided with an adjustable flow-rate valve, whereby hydrostatic pressure within the plenum may be varied by adjustment of the flow-rate valve to thereby vary concave deformation of the diaphragm, and thereby vary its magnification to a selected value.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated, the present invention comprehends a fogless mirror having a magnification which may be readily adjusted by a user from unity to larger positive values, e.g., over a magnification range of one-times to three-times (1× to 3×), or more. A fogless mirror according to the present invention is of a novel design and construction which not only enables the magnification factor of the mirror to be readily adjusted, but has a further advantage of being resistant to water droplets or fog condensing onto the viewing surfaces of the mirror when the mirror is used in a humid environment such as a bathroom or shower enclosure.

According to the present invention a fogless adjustable magnification mirror includes a ring-shaped, preferably circular, frame which holds in a first, front ring-shaped retainer groove in an inner longitudinal surface thereof an optically clear front viewing window. The latter preferably has a circular outline shape, and is made of a rigid transparent material such as glass or relatively thick polycarbonate or acrylic plastic, and is held in the front retainer groove in a fluid pressure-tight seal. A fogless adjustable magnification mirror according to the present invention also includes a flexible reflective mirror plate or diaphragm having a reflective surface and a circular shape. The flexible mirror plate is located behind the front viewing window, and is held in a fluid pressure-tight seal within a rear circular ring-shaped retainer groove provided in the inner longitudinal surface of the frame, rearward of the front viewing window retainer groove. Thus constructed, the mirror according to the present invention has formed between the front viewing window and rear flexible reflecting diaphragm thereof a sealed, hollow cylindrically-shaped interior space or plenum bordered on a peripheral longitudinal surface thereof by the inner annular surface of the frame.

The mirror according to the present invention is provided with an inlet port for conducting warm water into the interior space of the mirror, the inlet port penetrating the frame and communicating with the plenum. The mirror also includes an outlet port for conducting water from the plenum, the outlet port penetrating the frame at a location spaced circumferentially apart from and preferably diametrically opposed to the inlet port. A water supply conduit for conducting warm pressurized water to the mirror is connected by a fluid pressure tight coupling at one end thereof to the inlet port. Preferably, the water supply conduit is made of a flexible hose or tube, and has at the other end thereof a fitting, such as a threaded tee, which may be installed between a water supply pipe and shower head, and which diverts a small percentage of water flowing to the shower head, e.g., 5–10%, to the mirror water supply conduit.

The adjustable magnification fogless mirror according to the present invention also includes a water outlet conduit connected by a fluid pressure-tight coupling to the mirror outlet port. The outlet conduit, which is also preferably made of a flexible hose or tube, is provided with an in-line adjustable valve which enables adjustment of the flow rate of water from the mirror plenum. Warm water is supplied to the mirror by opening the hot and cold water supply valves to the shower head, gradually filling the mirror plenum with clear water. When water in the plenum has filled the space between the front reflective surface of the rear reflecting diaphragm and the rear surface of the front viewing window, the front reflective surface of the diaphragm, disk-shaped volume of water within the plenum, and front viewing window form a disk-shaped composite lens having a reflective rear mirror surface and no optical surface exposed to the air, thus precluding condensation fogging on any interior surface thereof. Moreover, heat conducted from warm water in the plenum through the viewing window to its front surface precludes condensation of water vapor in the shower enclosure on the front surface of the viewing window.

To increase the magnification of the fogless mirror according to the present invention, the valve in the warm water outlet port is adjustable from a fully-open to a partially closed position in which the fluid-flow cross-section of the valve orifice is reduced to a value less than fluid-flow cross-section of the water inlet conduit. Reducing the flow cross-section reduces the outlet flow rate of water through the mirror plenum, causing hydrostatic pressure in the mirror plenum to increase to a value greater than ambient atmospheric pressure. Increased hydrostatic pressure within the plenum in turn causes the rear flexible mirror diaphragm to bow outwardly of the plenum, i.e., rearwardly, which in turn causes the reflecting surface of the mirror diaphragm to deform from a flat to concave shape. Deformation of the reflective mirror surface causes the magnification of the mirror to increase from a value of unity, for the flat, undeformed mirror diaphragm to a positive value greater than unity. By adjusting the valve to further restrict water flow from the mirror, the hydrostatic pressure may be adjusted to higher values, resulting in greater concave deformation of the mirror diaphragm and an accompanying increase in the magnification of the mirror. Moreover, since the mirror diaphragm is made of an elastically deformable material such as polycabonate plastic, opening the magnification adjustment control valve to allow unrestricted flow of water through the mirror decreases hydrostatic pressure within the mirror plenum to a value close to atmospheric pressure, allowing the elasticity of the diaphragm to restore it to its flat shape, thus restoring the magnification of the mirror to a value of unity. Thus, the magnification of the adjustable magnification fogless mirror according to the present invention may be readily adjusted, while optical surfaces of the mirror are kept fog-free.

BRIEF DESCRIPTION OF THE DRAWINGS

FIG. 2 is a side elevation view of the mirror of FIG. 1.

FIG. 3 is a rear elevation view of the mirror of FIG. 1.

FIG. 4 is a longitudinal sectional view of the mirror of FIG. 1, taken along line 4—4.

FIG. 5 is a view similar to that of FIG. 4, but showing an interior space of the mirror partially filled with water.

FIG. 6 is a view similar to that of FIG. 5, but showing the interior space of the mirror filled with water and overflowing therefrom through an outlet conduit.

FIG. 7 is a view similar to that of FIG. 6, but showing a control valve in series with the outlet conduit partially closed, thereby restricting output flow rate, increasing hydrostatic pressure within the interior space of the mirror, and bowing a reflective diaphragm of the mirror outwardly.

DESCRIPTION OF THE PREFERRED EMBODIMENTS

Figure 1:
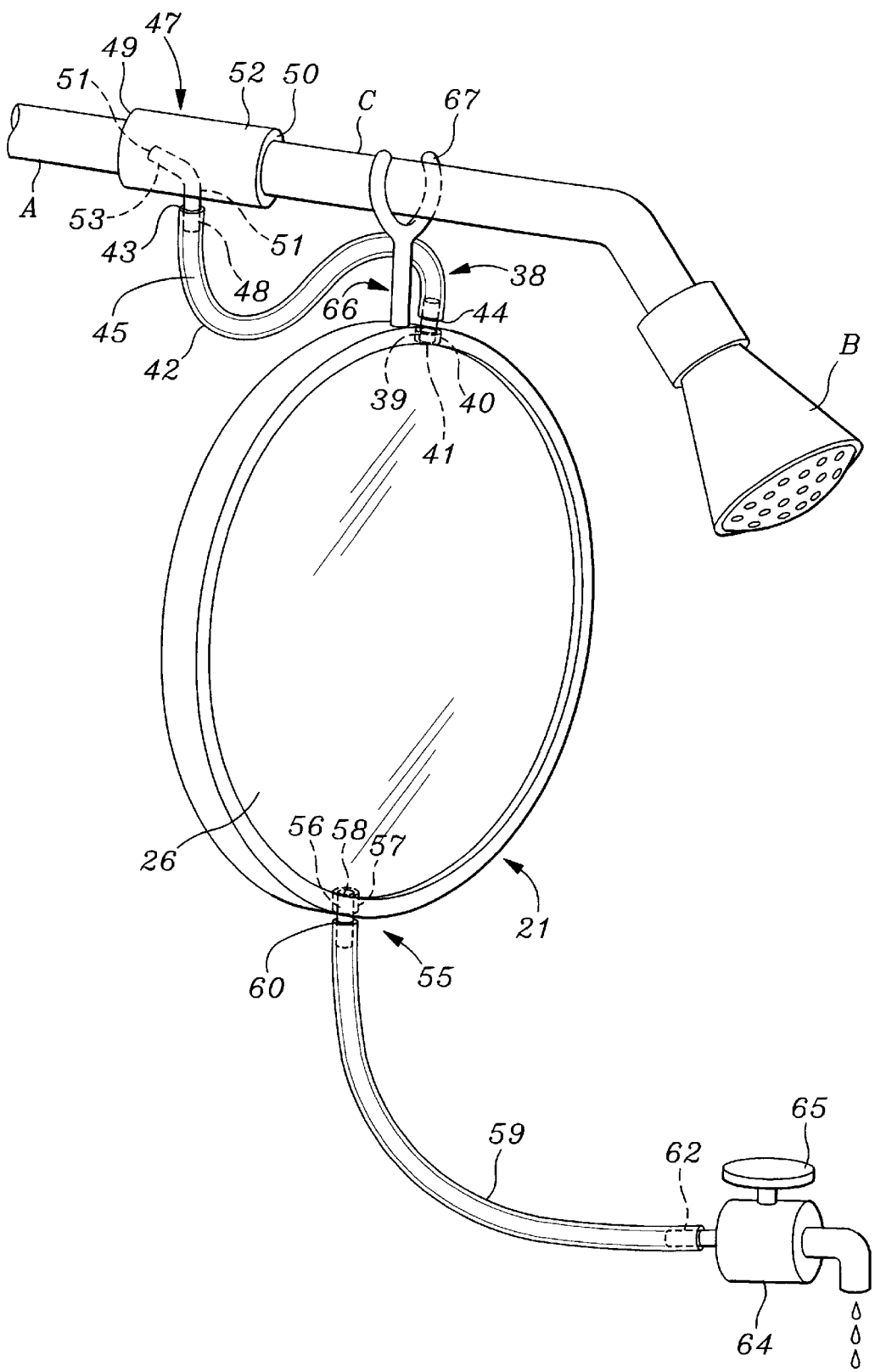
FIG. 1 is a front elevation view of an adjustable magnification fogless mirror according to the present invention.

FIGS. 1–7 illustrate an adjustable magnification fogless mirror according to the present invention.

Referring first to FIGS. 1–4, an adjustable magnification fogless mirror 20 according to the present invention may be seen to include a ring-shaped frame 21 having longitudinally disposed inner and outer peripheral wall surfaces 22 and 23, respectively. Frame 21 is made of any suitably rigid, water impervious material such as metal, acrylic-plastic, or the like. As may be seen best by referring to FIG. 4, frame 21 has formed in inner wall surface 22 thereof, inwardly or rearwardly from front annular surface 24, a first, front, annular ring-shaped groove 25. Fitted within front groove 25 is a circularly-shaped clear plate of uniform thickness forming a front viewing window 26. Front viewing window 26 is preferably made of a rigid, optically transparent material such as glass plate having a thickness of about 1/16 inch, or of polycarbonate or acrylic plastic having a thickness of about 1/8 inch. The outer circumferential edge wall 27 of front viewing window 26 is held within front annular groove 25 in frame 21 in a fluid pressure-tight seal, being bonded thereto by an epoxy adhesive or the like.

Referring still to FIG. 4, it may be seen that frame 21 of mirror 20 has formed in inner wall surface 22 thereof, inwardly from rear annular surface 28 of the frame, a second, rear annular ring-shaped groove 29. Fitted within rear groove 29 is a circular mirror diaphragm 30. Mirror diaphragm 30 is made of a relatively thin, elastically deformable sheet of material such as polycarbonate plastic having a thickness of about 1/16 inch. Also, mirror diaphragm 30 has front and rear parallel surfaces 31 and 32, one of which is metalized to form an optically flat, highly reflective mirrored surface. In a preferred embodiment, mirror diaphragm 30 is made of optically transparent acrylic or polycarbonate plastic, the rear surface 32 of which has vacuum deposited thereon a thin, highly reflective layer of aluminum forming a reflective mirror surface 33. Alternatively, mirror diaphragm 30 could be made of a thin sheet of stainless steel or other metal having a chrome plated front reflecting surface.

The circumferential edge wall 34 of mirror diaphragm 30 is held within rear annular groove 29 in frame 21 in a fluid pressure-tight seal, being bonded thereto by an epoxy adhesive or the like.

As shown in FIG. 4, front viewing window 26 of mirror 20 has a flat, circular rear face 35 located forward of front face 31 of mirror diaphragm 30, forming therebetween a cylindrically-shaped interior space or plenum 36, which has a circumferential boundary formed by inner peripheral wall surface 22 of frame 20. Front viewing window 26 also has a front exterior face 37 parallel to its rear face 35.

Referring now to FIGS. 1–4, it may be seen that mirror 20 is provided with an inlet port 38 for conducting warm water from an external source such as a shower pipe into plenum 36 of the mirror. Inlet port 38 includes a hollow tubular inner portion 39 which is held within an inlet bore 40 disposed radially inwardly from outer longitudinally disposed peripheral wall surface 23 of frame 21 through inner peripheral wall surface 22 of the frame. Inner tubular portion 39 of inlet port 38 is secured within an inlet bore 40 provided through frame 21 in a fluid pressure-tight seal, being bonded to the inlet bore wall by an epoxy adhesive or the like. Tubular portion 39 of inlet port 38 has through its length a longitudinally disposed bore or passageway 41 which communicates with plenum 36.

Referring still to FIGS. 1–3, it may be seen that mirror 20 includes a warm water supply tube 42 which is coupled in a fluid pressure-tight connection at a first, inlet end 43 thereof to a source of warm water, and at a second, outlet end 44 thereof to hollow tubular portion 39 of inlet port 38.

Warm water supply tube 42 is preferably made of a flexible hose, and may be coupled at outlet end 44 thereof to tubular portion 39 of inlet port 38 by receiving the inlet tube in a fluid pressure-tight interference fit within a bore 45 disposed through the length of the water supply tube. Alternatively, outlet end 44 of water supply tube 42 may be received directly within inlet bore 40 though frame 21 in a fluid pressure-tight seal, in which case the inner end of the water supply tube serves as inlet portion 39 of inlet port 38.

As shown in FIG. 1, during use of mirror 20, inlet end 43 of warm water supply hose 42 is coupled to a source of warm water. Thus, as shown in FIG. 1, inlet end 43 of warm water supply hose 42 preferably is coupled to the side outlet tube 48 of a T-fitting 47. The latter has an inlet tube 49 adapted to threadingly couple to the end of the shower-head water supply tube A, and an end outlet tube 50 adapted to threadingly couple to a shower head B. As shown in FIG. 4, side outlet tube 48 of T-fitting 47 is of smaller diameter than the common diameters of end inlet and outlet tubes 49 and 50 of the fitting, and has an inner end portion 51 which penetrates the cylindrical body 52 of the fitting. Inner end portion 51 of side outlet tube 48 has an entrance opening 53 which faces upstream towards inlet tube 49, and is so positioned and sized as to intercept a small percentage, e.g., 5% to 10%, of water flowing between inlet tube and end outlet tube 50, diverting the intercepted portion into the bore of the side outlet tube.

As shown in FIGS. 1–3, mirror 20 includes an outlet port 55 for conducting water out from plenum 36. Outlet port 55 includes a hollow tubular inner portion 56 which is held within an outlet bore 57 provided through frame 21. As shown in FIGS. 1 and 3, outlet bore 57 is disposed radially outwardly from inner peripheral wall surface 22 through outer peripheral wall surface 23 of frame 21. As is also shown in those figures, outlet bore 57 is spaced circumferentially apart from inlet bore 40, preferably at a location offset slightly from a point diametrically opposed to the inlet bore 40.

Hollow tubular inner portion 56 of outlet port 55 is secured within outlet bore 57 in a fluid pressure-tight seal, being bonded to the outlet bore wall by an epoxy adhesive or the like. Tubular portion 56 of outlet port 55 has through its length a longitudinally disposed bore or passageway 58 which communicates with plenum 36.

Referring still to FIGS. 1–3, it may be seen that mirror 20 includes a water outlet conduit 59 which is coupled in a fluid pressure-tight connection at a first, inlet end 60 thereof to hollow tubular portion 56 of outlet port 55. Water outlet conduit 59 has a second, outlet end 61 which has a outlet opening 62 which communicates with a bore 63 that is disposed through the length of the outlet tube.

Water outlet conduit 59 is preferably made of a length of flexible hose, and may be coupled at inlet end 60 thereof to tubular portion 56 of outlet port 55 by receiving the tube in a fluid pressure-tight interference fit within bore 63 of the water outlet tube. Alternatively, inlet end 60 of water outlet tube 59 may be received directly within outlet bore 57 through frame 21 in a fluid pressure-tight seal, in which case the inner end of the outlet tube serves as inner tubular portion 56 of outlet port 55.

Referring now to FIGS. 3 and 4, it may be seen that mirror 20 includes a valve 64 located in series or in-line with water outlet tube 59. Valve 64 has an internal orifice which controls the cross-section of water flowing through the valve, the size of the orifice and flow cross-section being adjustable by a control knob 65 to a value approximating that of bore 63 through water outlet tube 59, to smaller values. Thus, valve 64 functions as a throttle valve, controlling the flow rate of warm water out from plenum 36 which is supplied to the plenum through inlet port 38.

As shown in FIG. 1, mirror 20 includes means for mounting the mirror to a structural element such as a shower head water supply pipe. Thus, as shown in FIG. 1, mirror 20 may have a clamp 66 which protrudes upwardly from frame 21 of the mirror and which includes an upwardly protruding split ring 67 for attachment to a shower head supply pipe C. Clamp 66 is preferably longitudinally aligned with outlet port 55 of mirror 20. With this arrangement, water outlet port 55 is positioned below clamp 66, and offset slightly from inlet port 38, as shown in FIGS. 1 and 3.

Functional operation of mirror 20 may be best understood by referring to FIGS. 4 through 7. As shown in FIG. 4, plenum 36 of mirror 20 is initially empty. To use mirror 20, warm water is introduced into plenum 36 through inlet port 38 by connecting tee-fitting 47 between a shower head water supply pipe A and shower head B, as shown in FIGS. 1 and 4. Warm water is then admitted to shower water supply pipe A by opening shower valves (not shown), thus gradually filling plenum 36 with water D, as shown in FIG. 5. During this operation, throttle valve 64 is preferably adjusted by control valve 64 thereof to a fully open position, e.g., counterclockwise in FIG. 6, thereby minimizing back pressure and facilitating rapid filling of plenum 36 with water.

When plenum 36 is filled with water, as shown in FIG. 6, water D within the plenum optically contacts rear surface 35 of front viewing window 26 and front surface 31 of mirror diaphragm 30, thus forming a void-free liquid lens which precludes formation of any condensation droplets on either of those two surfaces. Moreover, heat conducted from warm water D within plenum 36 through front viewing window 26 to front face 37 of the viewing window raises the temperature of the front viewing window surface above the dew point of moist air within the shower enclosure, thus precluding fogging of the front surface of the mirror.

With throttle valve 64 in a fully open position as shown in FIG. 6, front and rear surfaces 31 and 32 of mirror diaphragm 30 are flat and parallel to front and rear surfaces 37 and 35 of front viewing window 26. Thus configured, mirror 20 has a unity or 1× magnification.

To increase the magnification of mirror 20 to a factor greater than one, control knob 65 of throttle valve 64 is turned in a direction, e.g., clockwise in FIG. 7, which reduces the fluid-flow cross-section of the valve to a value less than that of warm water inlet port 38. Reduction in fluid-flow cross-section of output port 55 relative to inlet port 38 causes the hydrostatic pressure of water D within plenum 36 to increase above ambient atmosphere pressure. This pressure increase within plenum 36 causes flexible mirror diaphragm 30 to bow outwardly of plenum 36, i.e., rearwardly as shown in FIG. 7. Thus, reflective surface 33 of mirror diaphragm 30 is deformed by an increase in hydrostatic pressure within plenum 36 from a flat surface as shown in FIG. 6, to the concave surface shown in FIG. 7. Deformation of reflective surface 33 to a concave shape causes the magnification of the mirror to increase from a value of unity, provided by the undeformed mirror, to a positive value greater than unity, e.g., 2×, 3× or more. FIG. 8 illustrates in a general way the magnification variation of mirror 20 as a function of the pressure differential between plenum 36 and the atmosphere, which is in turn a function of flow cross-section reduction of throttle valve 64.

When hydrostatic pressure within plenum 36 is reduced to a value approximating that of ambient atmospheric pressure, the elasticity of mirror diaphragm 30 restores it to a flat shape which provides unity magnification.

Additional control of the hydrostatic pressure within plenum 36 and therefore of the magnification factor of mirror 20, may be obtained by varying the relative sizes of the inlet and outlet fluid-flow cross-sections of water flowing into and out of, respectively, plenum 36. Thus, the magnification of mirror 20 may be biased to have a value greater than unity even with throttle valve 64 fully open, by making the diameter of the outlet bore tubular fitting or outlet hose bore smaller than that of the inlet bore. Conversely, the magnification may be biased to have a smaller value even with throttle valve partially closed by making the maximum bore of the throttle valve and outlet port larger than that of the inlet port.

What is claimed is:

1. A fogless mirror which is resistant to condensation fogging of water vapor on optical surfaces thereof comprising;
   a. a ring-shaped frame,
   b. a front viewing window mounted in said frame in a fluid pressure-tight seal therewith;
   c. a rear reflective mirror plate mounted in said frame in a fluid pressure-tight seal therewith at a location spaced rearward of said front viewing window forming between inner facing surfaces of said mirror plate and said window a sealed interior space bordered on a peripheral longitudinal surface thereof by an inner annular surface of said frame,
   d. means for filling said sealed interior space with water to thereby form a plenum, said water within said plenum contacting inner facing surfaces of said window and said mirror plate adjacent to said plenum and thereby precluding condensation fogging on said inner facing surfaces,
   e. means for maintaining said water within said plenum at a temperature above ambient air temperature, and
   f. means for conducting heat from said water within said plenum to a front, outer surface of said viewing window, thereby resisting condensation fogging on said front outer surface of said window.

2. The fogless mirror of claim 1 wherein said means for filling said plenum with water is further defined as comprising an inlet port which communicates with said plenum.

3. The fogless mirror of claim 2 wherein said means for maintaining said water within said plenum at a temperature above ambient air temperature is further defined as comprising in combination means for connecting said inlet port to a source of warm water under pressure, and means for conducting water from said plenum.

4. The fogless mirror of claim 3 wherein said means for conducting water from said plenum is further defined as an outlet port which communicates with said plenum.

5. The fogless mirror of claim 4 wherein said mirror plate is further defined as being an elastically deformable diaphragm.

6. The fogless mirror of claim 5 further including means for adjusting hydrostatic pressure of water within said plenum, whereby said mirror plate may be rearwardly deformed into a concave shape which produces a magnified image.

7. The fogless mirror of claim 6 wherein said means for adjusting hydrostatic pressure within said plenum is further defined as comprising means for adjusting relative sizes of fluid flow cross sections of said inlet and outlet ports.

8. The fogless mirror of claim 7 wherein said means for adjusting relative sizes of said fluid flow cross sections of said inlet and outlet ports is further defined as including an adjustable throttle valve coupled to said outlet port.

9. The fogless mirror of claim 3 wherein said means for conducting heat from said water within said plenum to said front surface of said viewing window is further defined as being a thermally conductive body coupling said plenum to said front surface.

10. The fogless mirror of claim 9 wherein said thermally conductive body is further defined as being said viewing window.

11. The fogless mirror of claim 3 wherein said means for connecting said inlet port to a source of warm water under pressure is further defined as including in combination a conduit coupled in fluid pressure-tight connection at a first end thereof to said inlet port, and a tee-fitting adapted to be installed between a water supply pipe and a shower head coupled to a second end of said conduit in a fluid pressure-tight connection.

12. An adjustable magnification fogless mirror comprising;
 a. a ring-shaped frame,
 b. a front viewing window mounted in said frame in a fluid pressure-tight seal therewith,
 c. a rear reflective mirror plate comprising an elastically deformable diaphragm having a reflective surface viewable through said window, said mirror plate being mounted in said frame in a fluid pressure-tight seal therewithin at a location spaced longitudinally rearward of said front viewing window and forming between said mirror plate and said window a plenum bordered on a peripheral longitudinal surface thereof by an inner annular surface of said frame,
 d. a first, inlet port for conducting warm water into said plenum, said inlet port being disposed through an outer annular surface and said inner annular surface of said frame into said plenum between said front viewing window and said rear reflective mirror plate,
 e. a second, outlet port for conducting water from said plenum, said outlet port being disposed through said outer and inner annular surfaces of said frame into said plenum between said front viewing window and said rear reflective mirror plate at a location spaced circumferentially apart from said inlet port, and
 f. means for adjusting hydrostatic pressure of water within said plenum to a value greater than atmospheric pressure, thereby causing said mirror plate to bow outwardly of said plenum and deforming said reflective surface to an adjustable concavity producing adjustable magnification reflected image formed of an object in front of said viewing window.

13. The fogless mirror of claim 12 wherein said means for adjusting said hydrostatic pressure within said plenum is further defined as including means for adjusting the flow rate of said water conducted through said plenum.

14. The fogless mirror of claim 13 wherein said means for adjusting said flow rate of water through said plenum is further defined as including means for adjusting the pressure of water provided to said inlet port of said mirror.

15. The fogless mirror of claim 13 wherein said means for adjusting said flow rate of water through said plenum is further defined as including means for adjusting the relative sizes of fluid-flow cross-sections of water flowing into said plenum through said inlet port and water flowing out of said plenum through said outlet port, respectively.

16. The fogless mirror of claim 15 wherein said means for adjusting said relative size of said fluid flow cross section of water through said outlet port is further defined as an adjustable throttle valve coupled in a fluid pressure-tight connection to said outlet port.

17. An adjustable magnification fogless mirror comprising;
 a. a ring-shaped frame,
 b. a front viewing window mounted in said frame in a fluid pressure-tight seal therewith,
 c. a rear reflective mirror plate comprising an elastically deformable diaphragm having a reflective surface viewable through said window, said mirror plate being mounted in said frame in a fluid pressure-tight seal therewithin at a location spaced longitudinally rearward of said front viewing window and forming between said mirror plate and said window a plenum bordered on a peripheral longitudinal surface thereof by an inner annular surface of said frame,
 d. a first, inlet port for conducting warm water into said plenum, said inlet port being disposed through an outer annular surface and said inner annular surface of said frame into said plenum between said front viewing window and said rear reflective mirror plate,
 e. a second, outlet port for conducting water from said plenum, said outlet port being disposed through said outer and inner annular surfaces of said frame into said plenum between said front viewing window and said rear reflective mirror plate at a location spaced circumferentially apart from said inlet port, and
 f. a throttle valve coupled in a fluid pressure-tight connection to said outlet port.

18. The fogless mirror of claim 17 wherein said mirror plate is further defined as being made of a thin polymer sheet.

19. The fogless mirror of claim 18 wherein said mirror plate is further defined as being a circular plate held within a rear annular groove formed in said inner annular surface of said frame.

20. The fogless mirror of claim 19 wherein said front viewing window is further defined as being a rigid optically clear plate held within a front annular groove formed in said inner annular surface of said frame.

21. The fogless mirror of claim 17 wherein said inlet port is further defined as being located above said outlet port.

22. The fogless mirror of claim 17 further including an inlet conduit coupled in a fluid pressure-tight connection at a first end thereof to said inlet port, and a tee-fitting adapted to be installed between a water supply pipe and a shower head in a fluid pressure-tight connection and a second end of said conduit, said tee being so constructed as to divert a portion of water flowing from said supply pipe to said shower head into said inlet conduit.

* * * * *